United States Patent Office 2,767,235
Patented Oct. 16, 1956

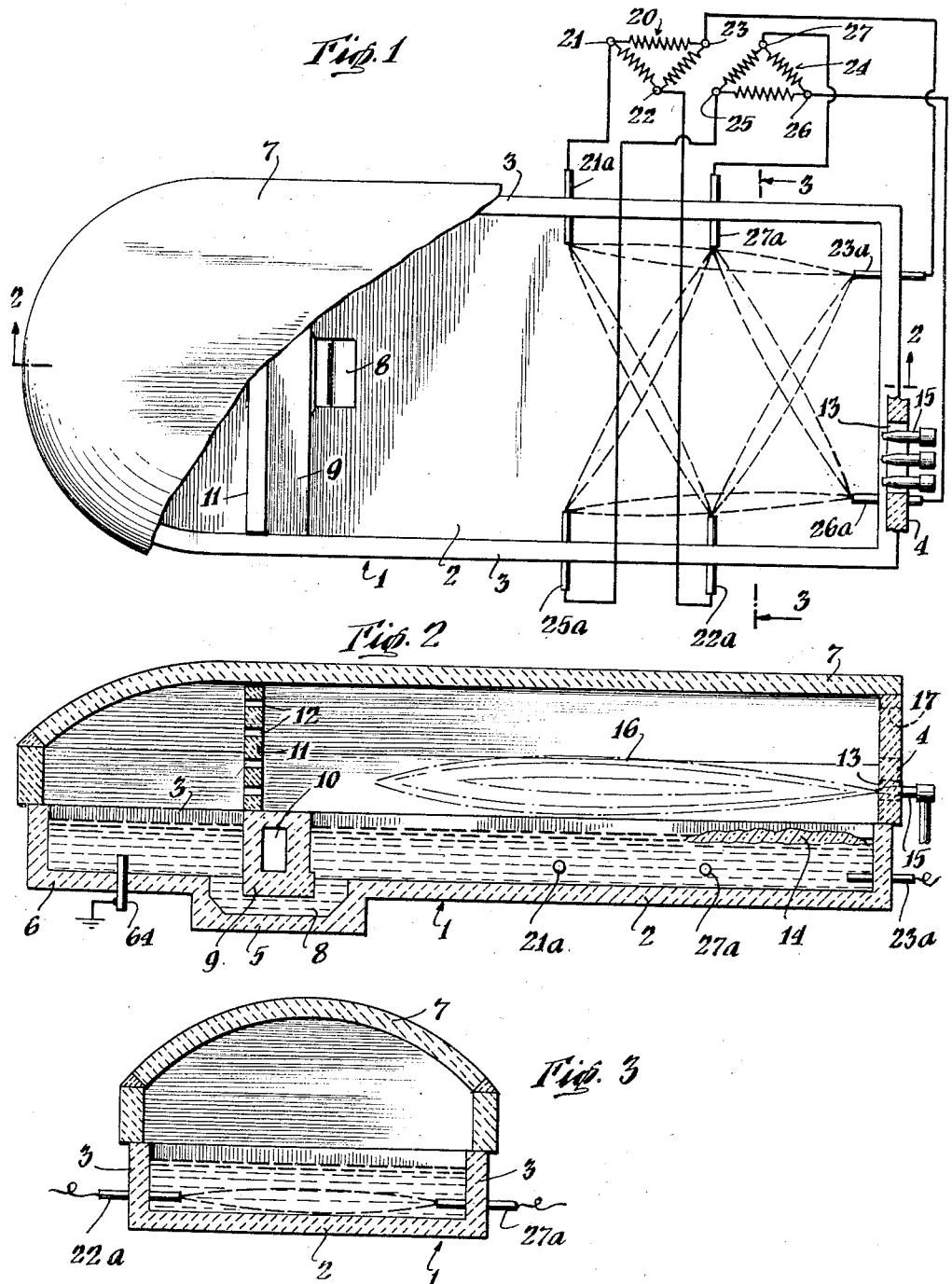

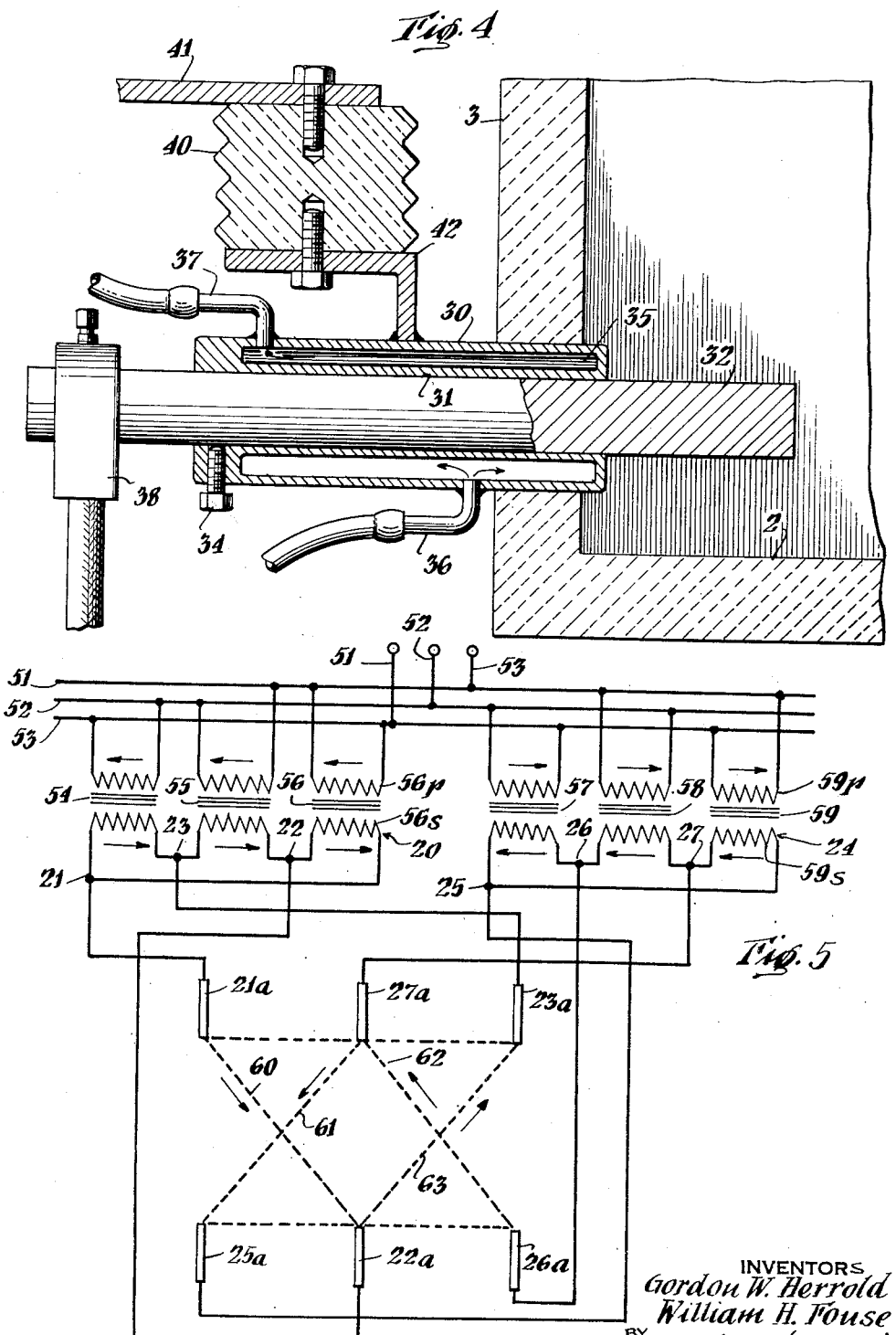

2,767,235

GLASS FURNACE AND METHOD OF HEATING

Gordon W. Herrold and William H. Fouse, Lancaster, Ohio, assignors to Anchor Hocking Glass Corporation, Lancaster, Ohio, a corporation of Delaware Application December 9, 1954, Serial No. 474,143

18 Claims. (Cl. 13—6)

The present invention relates to glass furnaces and more particularly to one in which gas and electric heating are combined to improve the melting operation and to increase the productive capacity of the furnace. The invention is primarily useful in a continuous furnace where a glass batch is delivered at one end of the furnace and the refined glass removed at the opposite end, the melting, fining and working progressing in a continuous operation as the glass flows from one end to the other. In such a continuous furnace the scum or batch line determines the productive capacity because when that line across the furnace is too far from the melting end thereof, there is insufficient time for the fining and working operations and hence the quality of the glass and the articles made from it will be impaired. To avoid such impairment, the rate of feeding raw materials to the furnace and the resulting capacity of the furnace must not exceed a predetermined rate; otherwise the scum line will encroach too far on the fining zone. The melting operation must end sufficiently near the melting end of the furnace to allow time for fining and working during the continuous flow of the molten glass.

By utilizing the present invention the production of a continuous flow furnace may be increased substantially over that of the usual gas-fired furnaces now in general use and at the same time a higher quality of molten glass will be delivered. The invention provides a tremendous saving in equipment for a given capacity and affords improved operation at the same time.

The combining of gas and electrical heating is known in glass furnaces and is known in furnaces of the continuous flow type, for example Wadman No. 1,944,855 on which the present invention is an improvement. In some furnaces the electrodes extend through the bottom of the furnace and usually where the rate of glass flow and the resulting abrasion are greatest, thus impairing the life of the electrodes. In other furnaces the electrodes may extend through the sides or the end of the furnace. All such installations are objectionable because uniformity of heating and fining is not obtained and, as a result, improperly treated glass reaches the working chamber and is delivered for fabrication of articles.

The present invention provides electrodes in the sides of the furnace adjacent to the batch end and in the batch end of the furnace. These electrodes are in the cooler portions of the furnace and in the portions where the flow of glass is least and hence the abrasion and wear on the electrodes is at a minimum. The connections to these electrodes establish current paths which produce thermal dams transversely of the flow of the glass to minimize the unmelted glass crossing these thermal dams. The dams are transverse zones across the furnace and across the flow of glass for the purpose of completing the melting operation quickly and uniformly. In addition, the electric current channels are such that the maximum amount of heat is at the middle of the furnace where the flow is the greatest, while the electrodes are located in cooler portions of the molten glass where the flow and abrasive effects are least.

An object of the present invention is to provide an improved continuous flow furnace combining gas and electricity in the melting of glass which overcomes objections of prior furnaces.

A further object of the invention is to provide electrodes in a continuous furnace and to establish electric current flow through the furnace whereby thermal dams are provided extending across the furnace to prevent glass from passing the last dam without being melted.

Another object of the invention is to provide electrodes in the sides and ends of a continuous flow glass furnace where the glass is coolest and the flow is least and to concentrate the electric heating in the middle of the furnace where the flow is greatest and where the heat is most needed.

Another object of the invention is to provide maximum heating effect in the longitudinal middle of the continuous flow furnace from electrodes in the side and end walls of the furnace.

Another object of the invention is to provide an improved continuous flow glass furnace having greater capacity and improved melting and fining.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a plan view of the furnace with the cover partially cut away;

Fig. 2 is a sectional view along the line 2—2 of Fig. 1;

Fig. 3 is a sectional view along the line 3—3 of Fig. 1;

Fig. 4 is an enlarged detailed view of the water-cooled side wall electrode mounting; and Fig. 5 is a wiring diagram of the furnace.

Referring again to the drawings illustrating a preferred embodiment of the invention and one way of performing the method, there is shown in Figs. 1, 2 and 3 a furnace of the flow type which may be substantially the same as furnaces now in use. The furnace indicated generally at 1 has a bottom 2, sides 3, and end 4, a throat section 5 and a so-called nose 6. A suitable cover 7 extends a substantial distance above the glass and encloses the surface of the glass with sufficient space for heating gases or flames to be applied to the surface of the glass for heating. As indicated the throat comprises a U-shaped channel 8 having a block 9 therein with a channel 10 extending through the block for cooling purposes. A suitable partition 11 may be provided above the block with apertures 12 therein.

The batch material for making glass is preferably fed through the end or the side of the furnace, adjacent to the end 4, onto the top of the glass, as shown at 14. The opening through which the batch material is fed is not shown. The glass is heated by a flame 16 delivered by burners 15. This heating is in addition to the electrical heating described hereinafter. In the usual practice, a group of burners 15 (Fig. 1) preferably three, apply flames through an opening 13 in one side of the end for about fifteen minutes, with the gases flowing over the surface of the glass and out through an opening 17 (Fig. 2) in the opposite side of the same end 4 of the furnace. The openings 17 are preferably about a foot above the burners, one delivering preheated air for combustion, the other serving as an outlet for the spent gases. After about fifteen minutes, the operation is reversed by operating a similar series of burners (Fig. 2) through an opening in the opposite side of the end 4, the burner gases passing over the molten glass and escaping through an opening (not shown) similar to 17 but in the opposite side of end 4. The purpose of this reversal is to have the spent gases pass through and heat up checkerbrick, so that the heat stored therein may preheat the incoming air to be mixed with the burner gas during the alternate cycle. In this way some of the heat from the exhaust gases is utilized and a saving in fuel obtained. The method of gas heating described above is the usual reversal process in general use.

The glass, as it is melted, flows along the length of the furnace, passing through the channel 8, commonly called the "throat," and into the working chamber 6, which is sometimes called the "nose" of the furnace.

The present invention is particularly useful in connection with a furnace of the flow type such as the one described above, but changes in construction may be made in the furnace without departing from the scope of the invention and there is no intention of limiting the invention to any particular type of continuous flow furnace.

The present invention, as illustrated more particularly in Figs. 1 and 5, embodies an improved arrangement of electrodes for electrically heating the glass in the furnace, so that the capacity of the furnace is increased substantially and the quality of the glass is improved by permitting a greater period for the refining operation.

Referring more particularly to Fig. 1, there is shown a delta circuit 20 having three terminals 21, 22 and 23 connected to the electrodes 21a, 22a, and 23a. A similar delta circuit 24 has three terminals 25, 26 and 27 connected respectively to electrodes 25a, 26a, and 27a. Preferably a transformer is utilized for each of the phases, so that six transformers in all are used with a double delta connection as shown. Preferably also each of the transformers has associated with it a booster, so that the voltage across each phase may be regulated as desired.

Continuing to refer to Fig. 1, it will be noted that the delta circuit 20 has two electrodes adjacent to one side wall and the third adjacent to the opposite side wall. The delta 24 on the other hand has its terminals connected to two electrodes on the opposite side wall and one on the side wall between the two electrodes of the delta 20. In this way the main path of the current through the glass adjacent to the end 4 of the furnace is in the form of two triangles or deltas inverted with respect to each other, so that one electrode of each delta is substantially at the middle of one side of the delta of the other circuit. Stated another way, there are two main paths of current running along the sides of the furnace between electrodes 21a and 23a and electrodes 25a and 26a. There are four main paths of current extending generally across the furnace and the two adjacent paths cross each other in the form of an X. In other words the shortest paths of the current across the furnace are substantially in the form of a double X.

An important feature of the present invention is that the flow of current through the deltas is such that the current in the respective legs of the X's flow in the same general direction and are cumulative. This may be accomplished by reversing the phases of one of the deltas with respect to the other; for example, by reversing the connections to terminals 21 and 22. In this way the two currents in the separate circuits add geometrically as they pass transversely through the glass across the furnace and their effect becomes cumulative. The heating effect of the current is $I^2R$ where I is the current in amperes and R, the resistance. Thus, since the current at the crossing of the paths is substantially increased, the heating effect in the middle of the furnace along the line of flow will be increased substantially. Thus the greatest amount of electric heating will be produced where the glass flow is greatest and the least amount of heat will be produced adjacent to the sides of the furnace where the glass flow is least and where lower temperatures are desired.

In addition the crossing of the paths in the form of an X creates a pair of thermal dams having a higher temperature than the adjoining portions, which tends to prevent the passage of unmelted glass past these portions. This is particularly true with reference to the second dam. In addition, since four current paths travel transversely across the furnace, a large portion of the heat will be generated in these paths across the furnace which tends to melt any particles of unmelted glass passing through them. The differences in temperatures also create circulation where the glass has its greatest flow and assists both in the melting and in the removal of undesirable gases.

While there are so-called stray currents between other electrodes, the main flow of current in the molten glass is along the paths shown in the drawings, as those paths are each subject to the full voltage across one phase of a transformer secondary with the current limited only by the impedance in the transformer secondary and in the outside circuit including the path through the molten glass. If a voltmeter is connected from the electrode 21a respectively to the three electrodes 25a, 26a, and 27a which are connected to the terminals of the delta 24, differences in potential will be shown in each instance. The same applies with respect to the electrodes 22a and 23a with respect to the electrodes 25a, 26a, and 27a. However, the current delivered from a terminal of the first delta 20 through the molten glass to an electrode in the second delta circuit 24 and back to the terminal of the delta circuit 20, has to pass through a series of transformer windings in the two delta circuits instead of a single winding in one delta circuit; hence the currents resulting are so-called stray currents.

Fig. 5 is a circuit diagram of the electrical wiring of the furnace. A standard three-phase voltage source is indicated by the bus wires 51, 52, and 53. The transformers used to provide the double delta heating circuit are connected to these bus wires.

Transformers 54, 55, and 56 are connected to form a first delta connection 20, and transformers 57, 58 and 59 are connected to form a second delta 24. Although the electrodes may be connected with almost any phase relations, the connection as shown in Fig. 5 produced an unexpected and greatly increased heating effect over other possible phase relationships.

As seen in Fig. 5, the primary 56p of transformer 56 is connected between bus wires 51 and 53 and secondary 56s is connected between electrodes 21a and 22a. A resulting current path 60 is indicated between electrodes 21a and 22a. Transformer 59 is connected to the same input phase as transformer 56, i. e., between bus wires 51 and 53, and its secondary 56s is connected between electrodes 25a and 27a. A resulting current path 61 between these electrodes is indicated.

Transformers 56 and 59 are connected in such phase relationship to each other that current 60 flowing from electrode 21a to electrode 22a is in phase with current 61 flowing from electrode 27a to electrode 25a. This phase relationship creates the unexpected heating increase in an area extending generally crosswise of the furnace adjacent to the point where current paths 60 and 61 cross. It is thought that this increased heating results from the following action. With electrodes 21a, 22a, 25a, and 27a connected as shown and described above, two principal current paths 60 and 61 are created between the electrodes. With these currents in phase as described the current distribution is concentrated in a generally crosswise area adjacent to the crossover point of currents 60 and 61. The concentrated current provides a very efficient heating, as the heating effect of the currents is proportional to the square of the current and greater over-all heating of the glass thus results where the currents are cumulatively phased and are concentrated into high current density paths. A second effect is also thought to contribute to the creation of the crosswise heating area or thermal dam for the connection shown. This secondary effect is due to the fact that as the temperature of the molten glass goes up, its resistance decreases. This results in current concentrations causing more efficient heating than distributed currents, since as the resistance decreases with the temperature increase there is an increase in the concentrating current and the heating increases as the square of the resulting increased current. For example, doubling the concentration of current in an area would quadruple the electric heating effect in that area. This also allows the furnace to be run at the full current capacity of its supply source with relatively low voltages.

Transformers 55 and 58 are similarly connected to complete the delta connections and are phased to produce in-phase currents 62 and 63, so that a second thermal dam extends transversely of the furnace through the crossover point of currents 62 and 63. Thus, transformers 55 and 58 are both connected between bus wires 51 and 52 and they are phased with respect to each other, so that current from electrode 22a to electrode 23a is in phase with current from electrode 26a to electrode 27a.

For purposes of safety, a grounding electrode 64 may be inserted through the bottom of the refining end preferably near the middle of it and grounded to the steelwork. The potential above ground of the glass in the feeder and refining end is reduced substantially thereby and the danger of electric shocks is reduced.

While any suitable means may be utilized for mounting the electrodes, a preferred embodiment is shown in Fig. 4. A metal sleeve 30 having an inner bore 31 adapted to receiving an electrode 32 is provided for with a set screw 34 for holding the electrode in position. Preferably the electrode is made of molybdenum which is water-cooled by passing water through the hollow jacket 35 in sleeve 30. A suitable inlet connection is indicated at 36 and an outlet at 37. The usual cable is shown connected at 38. The sleeve 30 is shown suitably insulated by the insulator 40 held in position by the brackets 41 and 42. It will be understood that other suitable mountings may be utilized, if desired.

In operation, batch material for melting is delivered through the end or a side of the furnace adjacent to the end 4 in the usual manner and a suitable flame 16 is applied to the surface by burners 15 on one side with the spent gases escaping through an opening 17 in the end 4. After an interval of about fifteen minutes, the burners 15 are turned off and other burners at the opposite side of the end are placed into operation and the flow of gas is reversed with the spent gases escaping through an opening (not shown) similar to opening 17 but at the opposite side of end 4 in accord with the usual practice. The glass, as it is melted, is refined and passes through throat 8 into the nose portion of the furnace where it may be delivered to suitable feeders supplying fabricating machines. This is generally the flame heating process commonly used in furnace operations.

While in the above embodiment of the invention the flame heating of the furnace is described for convenience as being done by gas, it is to be understood that oil or producer gas or other suitable fuel may be used for the combustion heating. The term "gas" for heating is intended to and does includes any suitable fuel for combustion heating.

In order to increase the capacity of the furnace and to improve the quality of the glass, electrodes are provided; two in the respective sides of the furnace and two in end 4 of the furnace, so that a double delta circuit may be set up within the glass flowing along the furnace. This circuit has the paths across the furnace in the form of a double X with a lateral path along each side of the furnace between the outer ends of the X's. By having the flow of current in the deltas in the same direction in the respective X's the currents become cumulative and increase greatly the amount of heat across these portions of the furnace and particularly at the middle of the furnace where the flow of glass is fastest and the requirement for heat is greatest.

The capacity of the furnace and the quality of the glass are generally determined by the so-called batch or scum line. By this utilization of the present electrical heating, it is possible to increase the capacity of the furnace as much as 40% and at the same time to shorten the distance that the batch line extends, so that a longer time is permitted for fining, thus increasing the quality of the glass as well as the quantity.

The proper direction of current in respect to the electrodes may be obtained by reversing the phases of one of the circuits in respect to the phases of the other circuits.

It will be seen that this present invention provides an improved furnace for melting glass and similar materials which increases substantially the capacity of the furnace and the quality of the glass. This may be done without changes in the furnace construction other than the provision of suitable electrodes in the wall of the furnace. These electrodes preferably are adjacent to the sides of the furnace where the flow is least to reduce the abrasion and wear on the electrodes and where the temperature is lowest; thus giving better operating results. The invention may be applied to existing furnaces with resulting increased production and improved quality of glass, and the invention may be applied also to new installations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. The method of heating glass in a continuous flow furnace which comprises passing at least two electric currents across the furnace angularly directed with respect to the direction of glass flow with the shortest current paths crossing at an angle to each other near the middle of the glass flow stream and maintaining the direction of flow of the electric currents the same generally transversely of the glass flow stream, so that their heating effect will be cumulative and greatest near the middle of the glass flow stream.

2. The method as claimed in claim 1 in which the electrical heating is in addition to gas heating.

3. The method as claimed in claim 1 in which the shortest paths for the current across the furnace form an X.

4. The method of heating glass in a continuous flow furnace which comprises passing at least two pairs of electric currents across the furnace angularly directed with respect to the direction of glass flow with the shortest current paths of each pair of currents crossing at an angle to each other near the middle of the glass flow stream and maintaining the directions of the currents in each pair of electric currents the same generally transversely of the glass flow stream, so that the heating effect of each pair of currents will be cumulative and greatest near the middle of the flow stream.

5. The method as claimed in claim 4 in which the shortest path for each of the pairs of currents is in the form of an X and the two pairs forming generally a double X.

6. The method of heating glass in a continuous flow furnace which comprises passing a three-phase current through the glass with two phases or sides passing across the furnace and meeting at an electrode and the shortest path of the other phase being along one side of the furnace and superimposing another three-phase current over said first three-phase current with the shortest paths of two phases or sides passing across the furnace and meeting at an electrode, the shortest paths of said two crossing the shortest paths of the transverse phases of said first three-phase current at angles forming in effect in a double X with the shortest path of the third phase being along the other side of the furnace, the currents in said paths crossing each other flowing in the same direction, so that their heating effect will be cumulative.

7. The method as claimed in claim 6 in which the transverse paths form in effect a pair of thermal dams across the flow of glass.

8. The method as claimed in claim 6 in which the three-phase currents are from the secondaries of a double three-phase source and the connections of one of the three-phase primaries reversed to reverse the direction of its secondary current with respect to direction of the current in the other three-phase secondary circuit.

9. The method as claimed in claim 6 in which the glass in the furnace is also heated by combustion.

10. In a continuous flow glass furnace for melting and fusing glass having a bottom wall, a side wall, and an end wall the combination of three electrodes adjacent to one side wall and three electrodes adjacent to the opposite side wall, a three-phase current source connected to one electrode adjacent to one side wall and to two of the electrodes adjacent to the other side wall and another three-phase current source connected to the remaining two electrodes adjacent to one side wall and to the remaining one electrode adjacent to the other side wall.

11. The furnace as claimed in claim 10 in which the two electrodes adjacent to one side wall are the end ones and the one electrode in each case is the middle one.

12. The furnace as claimed in claim 10 in which certain of the electrodes pass through the side walls of the furnace.

13. The furnace as claimed in claim 10 in which certain of the electrodes pass through the end wall of the furnace.

14. The furnace as claimed in claim 10 in which the connections of one of the three-phase current sources are reversed with respect to the other to cause the heating effects of the currents whose shortest paths cross near the middle of the furnace to be cumulative.

15. The furnace as claimed in claim 10 in which the shortest paths of the currents across the furnace are in the form of a double X.

16. The furnace as claimed in claim 10 in which four of the electrodes are ahead of the batch line and two are beyond it.

17. The furnace as claimed in claim 10 in which the four-current phases passing across the furnace form a pair of thermal dams extending transversely of the furnace.

18. The furnace as claimed in claim 17 in which the one thermal dam is ahead of the normal batch line and the other is beyond it.

References Cited in the file of this patent

UNITED STATES PATENTS

| | | |
|---|---|---|
| 1,880,591 | Wadman | Oct. 4, 1932 |
| 1,944,855 | Wadman | June 23, 1934 |
| 2,018,883 | Ferguson | Oct. 29, 1935 |
| 2,267,537 | Romazotti | Dec. 23, 1941 |
| 2,417,913 | Cornelius | Mar. 28, 1947 |
| 2,490,339 | De Voe | Dec. 6, 1949 |
| 2,545,619 | Lambert | Mar. 20, 1951 |

FOREIGN PATENTS

| | | |
|---|---|---|
| 909,917 | France | Jan. 10, 1946 |